United States Patent
Braley et al.

(10) Patent No.: US 12,174,324 B2
(45) Date of Patent: Dec. 24, 2024

(54) IN-SITU SENSOR CALIBRATION FOR AUTONOMOUS VEHICLES

(71) Applicant: Waymo LLC, Mountain View, CA (US)

(72) Inventors: Colin Andrew Braley, Mountain View, CA (US); Antonio Teran Espinoza, Chula Vista, CA (US)

(73) Assignee: Waymo LLC, Mountain View, CA (US)

( * ) Notice: Subject to any disclaimer, the term of this patent is extended or adjusted under 35 U.S.C. 154(b) by 1051 days.

(21) Appl. No.: 17/115,705

(22) Filed: Dec. 8, 2020

(65) Prior Publication Data

US 2022/0179056 A1    Jun. 9, 2022

(51) Int. Cl.
| | | |
|---|---|---|
| *G01S 7/497* | (2006.01) | |
| *G01S 17/86* | (2020.01) | |
| *G01S 17/89* | (2020.01) | |
| *G06T 7/50* | (2017.01) | |

(52) U.S. Cl.
CPC ............. *G01S 7/497* (2013.01); *G01S 17/86* (2020.01); *G01S 17/89* (2013.01); *G06T 7/50* (2017.01); *G06T 2207/10028* (2013.01)

(58) Field of Classification Search
None
See application file for complete search history.

(56) References Cited

U.S. PATENT DOCUMENTS

| | | | |
|---|---|---|---|
| 8,587,583 B2 | 11/2013 | Newcombe et al. | |
| 9,251,590 B2 | 2/2016 | Sharp et al. | |
| 2012/0194516 A1 | 8/2012 | Newcombe et al. | |
| 2017/0124781 A1* | 5/2017 | Douillard | G08G 1/207 |
| 2019/0324129 A1* | 10/2019 | Castorena Martinez | G01C 11/06 |
| 2021/0089058 A1* | 3/2021 | Stoschek | G01S 17/933 |

FOREIGN PATENT DOCUMENTS

EP    3008702    6/2019

OTHER PUBLICATIONS

A Generalized 2D and 3D Multi-Sensor Data Integration Approach based on Signed Distance Functions for Multi-Modal Robotic Mapping (Year: 2014).*
Large Scale 2D Laser SLAM using Truncated Signed Distance Functions (Year: 2019).*

* cited by examiner

*Primary Examiner* — Yuqing Xiao
*Assistant Examiner* — Jempson Noel
(74) *Attorney, Agent, or Firm* — Fish & Richardson P.C.

(57) ABSTRACT

Methods, systems, and apparatus, including computer programs encoded on computer storage media, for using naturally collected data in sensor calibration. One of the methods includes obtaining, using a first, calibrated sensor, a first plurality of raw sensor measurements of an environment; determining, from the first plurality of raw sensor measurements, a Truncated Signed Distance Field (TSDF)-based model of surfaces in the environment; obtaining, using a second sensor, a second plurality of raw sensor measurements of the environment; determining a multi-dimensional point cloud representation of the environment; and determining refined values of the set of calibration parameters of the second sensor based on a difference between, for each data point, (i) the multiple values that define the data point and (ii) multiple values that define a target data point derived from the TSDF-based model of surfaces in the environment.

20 Claims, 4 Drawing Sheets

IN-SITU SENSOR CALIBRATION FOR AUTONOMOUS VEHICLES

BACKGROUND

This specification relates to autonomous vehicles.

Autonomous vehicles include self-driving cars, boats, and aircraft. Autonomous vehicles use a variety of on-board sensors and computer systems to detect nearby objects and their respective characteristics (position, shape, heading, speed, etc.) and use such detections to make control and navigation decisions.

The various on-board sensors may require calibration periodically to ensure quality of sensor observations by removing systematic errors in the sensor observations. Systematic errors are differences between an expected output and a measured output of a sensor, which show up consistently every time a new observation is taken. For example, camera sensor calibration involves estimation of respective values for a set of camera parameters, i.e., intrinsic or extrinsic parameters, that can be used to define internal characteristics of the camera sensor as well as its position and orientation with respect to a fixed reference frame.

Sensor calibration has traditionally required immense amounts of manual labor in order to meticulously operate the sensor to capture multiple observations of a calibration target, e.g., a planar or cubic object with/without patterns affixed to its surface, of which the geometry is known, and ideally within a dedicated, e.g., closed and structured, environment. Manual sensor calibration is tedious, time-consuming, and error prone. In addition, calibration parameter values that have been determined for one sensor can generally not be used for other sensors, even when they are of a same type, or located on a same vehicle.

SUMMARY

This specification describes how an on-board system of a vehicle, e.g., an autonomous or semi-autonomous vehicle, can use sensor data collected by an already calibrated sensor of the vehicle, information derived from the sensor data, or both as reference data to calibrate one or more other sensors of the vehicle. The system can then determine respective values for a set of sensor calibration parameters based on a difference between the current data collected by using each of the one or more sensors of the vehicle and the reference data and by using non-linear optimization techniques.

Particular embodiments of the subject matter described in this specification can be implemented so as to realize one or more of the following advantages.

A system described in this specification can calibrate various sensors, e.g., one or more LIDAR sensors of a vehicle, using data collected by another, already-calibrated sensor under a natural environment, e.g., instead of a closed (e.g., structured and controlled) calibration facility. This allows for the system to automatically and effectively determine updated calibration parameter values for an arbitrary number of sensors and thereafter compute an accurate mathematical modeling of the sensor behaviors which accounts for, or compensates for, any changes or displacements that have taken place since each of the sensor was calibrated last time.

Because transportation of the sensors to/from the closed calibration facility, as well as meticulous operation of the sensors in order to capture multiple desired measurements of a special calibration target are no longer required, the system can dramatically reduce the amount of time and cost that is required by conventional sensor calibration techniques. The process makes sensor calibration less manual and correspondingly, more scalable. In particular, this process can minimize the overall human labor cost (e.g., in terms of human operator time), equipment cost (e.g., in terms of vehicle downtime), or both required for calibration of on-board sensors that would otherwise upsurge as the fleet of vehicles equipped with multiple sensors grows in size.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how an on-board system of a vehicle, e.g. an autonomous or semi-autonomous vehicle, can use sensor data collected by another, already calibrated sensor, information derived from the sensor data, or both as reference data to calibrate one or more sensors of the vehicle. In brief, the system can do this by building in real-time an implicit representation of an environment surrounding the vehicle in the form of a Truncated Signed Distance Field (TSDF), and using it as a ground truth source when implementing the sensor calibration processes.

Figure 1:
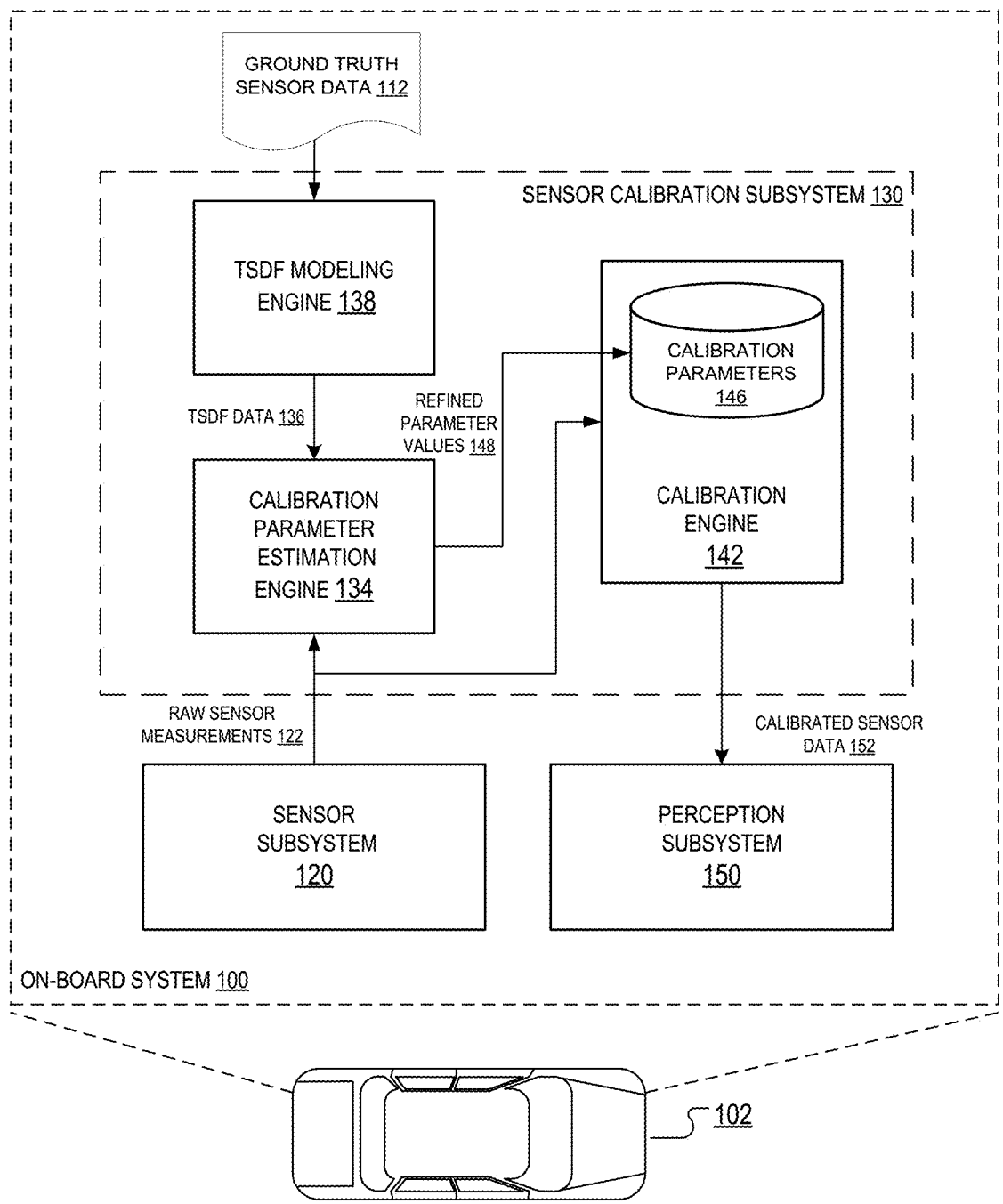
FIG. 1 is a diagram of an example system.

FIG. 1 is a block diagram of an example on-board system 100. The on-board system 100 is physically located on-board a vehicle 102. The vehicle 102 in FIG. 1 is illustrated as an automobile, but the on-board system 100 can be located on-board any appropriate vehicle type. The vehicle 102 can be a fully autonomous vehicle that makes fully-autonomous driving decisions or a semi-autonomous vehicle that aids a human operator. For example, the vehicle 102 can autonomously apply the brakes if a full-vehicle prediction indicates that a human driver is about to collide with a detected object, e.g., a pedestrian, a cyclist, another vehicle. While the vehicle 102 is illustrated in FIG. 1 as being an automobile, the vehicle 102 can be any appropriate vehicle that uses sensor data to make fully-autonomous or semi-autonomous operation decisions. For example, the vehicle 102 can be a watercraft or an aircraft. Moreover, the on-board system 100 can include components additional to those depicted in FIG. 1 (e.g., a control subsystem or a user interface subsystem).

The on-board system 100 includes a sensor subsystem 120 which enables the on-board system 100 to "see" the environment in a vicinity of the vehicle 102. The sensor subsystems 120 include a combination of components that receive reflections of electromagnetic radiation, e.g., LIDAR systems that detect reflections of laser light, radar systems that detect reflections of radio waves, and camera systems that detect reflections of visible light.

The raw sensor measurements 122 generated by a given sensor generally indicates a distance, a direction, and an intensity of reflected radiation. For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

The sensor subsystem 120 or other components of the vehicle 102 can also classify groups of one or more raw sensor measurements from one or more sensors as being measures of an object of a particular type. A group of raw sensor measurements, e.g., a group of raw LIDAR, radar, or camera sensor measurements, can then be curated and/or represented in any of a variety of ways, depending on the kinds of sensor measurements that are being captured.

In particular, a group of raw LIDAR sensor measurements ("laser shot points") can be transformed to a point cloud according to a set of calibration parameters. Each raw LIDAR sensor measurement z can usually be defined in a polar coordinate system, i.e., each raw LIDAR sensor measurement $z=\{r_{raw}, \theta_{raw}, \phi_{raw}\}$ can be defined by a range value, a pitch angle, and a yaw angle. A point cloud is a collection of data points defined by a given coordinate system. For example, in a three-dimensional coordinate system, a point cloud can define the shape of an object, where each point in the point cloud is defined by three values representing respective coordinates in the coordinate system, e.g., (x, y, z) coordinates, e.g., with reference to a predefined coordinate frame. As another example, in a three-dimensional coordinate system, each point in the point cloud can be defined by more than three values, wherein three values represent coordinates in the coordinate system and the additional values each represent a property of the point of the point cloud, e.g., an intensity of the point in the point cloud. In this specification, for convenience, a "point cloud" will refer to a three-dimensional point cloud, i.e., each point is defined by three values, but in general a point cloud can have a different dimensionality, e.g., two-dimensional or four-dimensional.

Once the sensor subsystems 120 classify one or more groups of raw sensor measurements as being measures of a respective object of a particular type, the on-board system 100 can use a sensor calibration subsystem 130 to transform, according to a set of calibration parameters, each group of raw sensor measurements 122 into corresponding calibrated sensor data 152, e.g., a point cloud, and send the calibrated sensor data 152 to a perception subsystem 150 for use in generating perception outputs. For example, the perception subsystem 150 implements components, e.g., machine learning models, that identify or classify objects within a vicinity of the vehicle, i.e., within the environment as characterized by the calibrated sensor data 152. Examples of object categories include pedestrians, cyclists, or other vehicles near the vicinity of the vehicle 102 as it travels on a road.

In many cases, the primary factor in the quality of perception outputs is the accuracy (e.g., in terms of reprojection error) in transforming (or projecting) the raw sensor measurements 122 into calibrated sensor data 152. In other words, an accurate knowledge of calibration parameter values of different sensors within the sensor subsystem 120 can generally ensure overall perception quality. Compared with processing miscalibrated sensor data, the perception subsystem 150 can generally generate higher quality (e.g., more accurate, precise, or both) perception outputs by processing calibrated sensor data 152, as the miscalibrated sensor data might have errors. In fact, in some cases, these errors are systematic (or structural) errors, i.e., differences between an expected output and a measured output of a sensor, which show up consistently every time a new measurement is taken.

High quality perception outputs are usually desirable. For example, when provided to a planning subsystem, the planning subsystem can use the high quality perception outputs to generate timely and precise planning decisions which cause the vehicle 102 to travel along a safe and comfortable trajectory.

Turning back to the sensor calibration subsystem 130, to effectively transform raw sensor measurements 122 into calibrated sensor data 152, the sensor calibration subsystem 130 is configured to compute, for each of one or more of the on-board sensors of the vehicle 102, an estimation of respective values for a set of calibration parameters defining the characteristics or properties that affect the measurement capturing process of the sensor. The sensor calibration subsystem 130 can then use these parameters to define a transformation which accounts for, or compensates for, any errors including distortions, offsets, and/or misalignments that may be present in the process.

In particular, calibration parameters for a LIDAR sensor can include (i) a set of intrinsic calibration parameters which collectively define laser internal properties, and (ii) a set of extrinsic calibration parameters, including parameters that define a rotational transformation $R \in SO(3)$ and parameters that define a translational transformation $t \in R^3$, which collectively defines the position and orientation of the LIDAR sensor with respect to a fixed reference coordinate frame, e.g., vehicle coordinate frame.

As a particular example, the set of intrinsic calibration parameters can include mirror offset angle ($\xi mo$), transmitter rotation angle ($\xi txr$), distance offset ($\xi do$), or a combination thereof. In this example, the mirror offset angle ($\xi no$) is a correction to the calculated pitch of a laser shot indicating the incidence angle between the transmitter's ray and the mirror's surface. The transmitter rotation angle ($\xi txr$) is an angle between the transmitter beam and the plane perpendicular to the mirror's axis of rotation. The distance offset ($\xi do$) is a distance, e.g., as measured in meters, to be added to each range measurement.

Each such calibration parameters is associated with one or more real-valued numeric values that generally define how, or in what magnitude, the operation corresponding to the calibration parameter should be applied to the measurement capturing process. For example, the intrinsic mirror offset angle ($\xi mo$) parameter value defines a value of an angle to be added as correction to the raw beam pitch value measured by the LIDAR. As another example, the extrinsic translation parameter values, which include 3 values each specifying a respective displacement along x, y, or z axis, define the translational transformation of a position of each point in the point cloud data from LIDAR coordinate frame to vehicle coordinate frame.

To determine current values of these calibration parameters in an accurate and effective manner, the sensor calibration subsystem 130 can implement a truncated signed distance function (TSDF) modeling engine 138 that is configured to convert ground truth sensor data 112 which includes a calibrated point cloud determined from raw sensor measurements collected by using an already calibrated sensor into TSDF data 136 which represents a 3D model of surfaces in the environment. The calibrated LIDAR sensor refers to a LIDAR sensor the calibration parameter values of which are known.

TSDF-based environment modeling is described in more detail in US patent publication 20120194516 entitled "Three-dimensional environment reconstruction" Newcombe et al. filed on 31 Jan. 2011 and published on 2 Aug. 2012, which is herein incorporated by reference.

In brief, this process may begin with building an empty 3D model which is gradually filled by aggregating ground truth sensor data 112, information derived from ground truth sensor data 112, or both. The resulting 3D model may be stored at a memory device accessible to the system 100, for example, as a 3D voxel grid, where each voxel stores a numerical value which is a truncated signed distance function value.

A signed distance function calculation gives the value of the distance between the current voxel and a nearest surface of the environment and is signed such that voxels outside (i.e., external to) a surface of the environment (from the LIDAR sensor's perspective) are given a positive distance, and voxels inside (i.e., internal to) a surface of the environment (from the LIDAR sensor's perspective) are given a negative distance. A value of zero indicates that the associated voxel resides exactly on a surface of the environment.

Figure 3A:
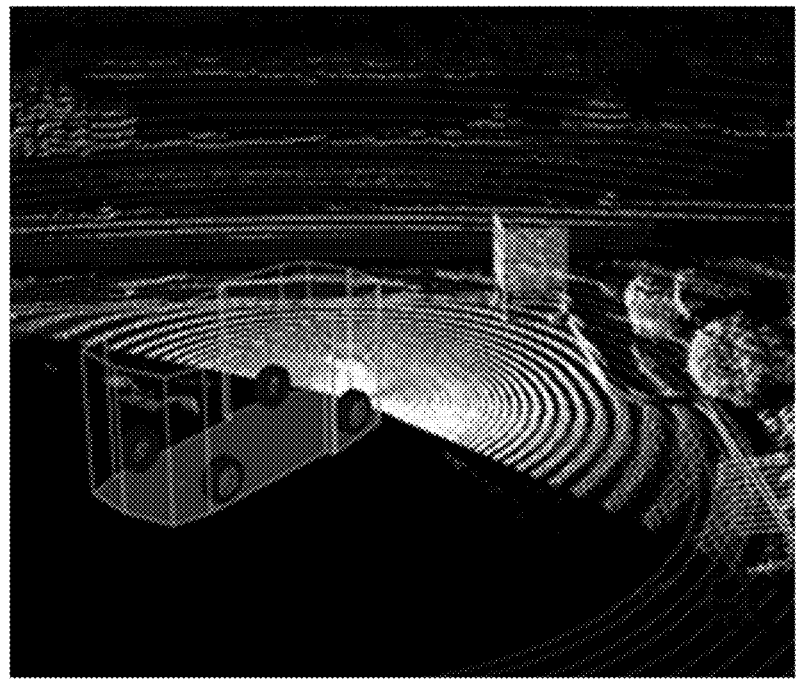
FIGS. 3A-B are illustrations of an example point cloud representation of an environment and a TSDF-based representation of the environment, respectively.
Figure 3B:
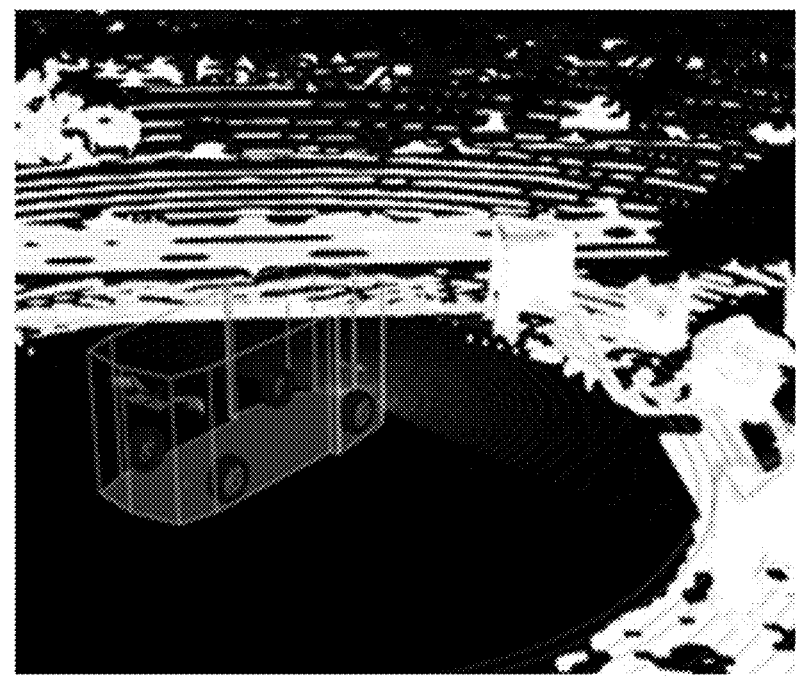
Figure 4:
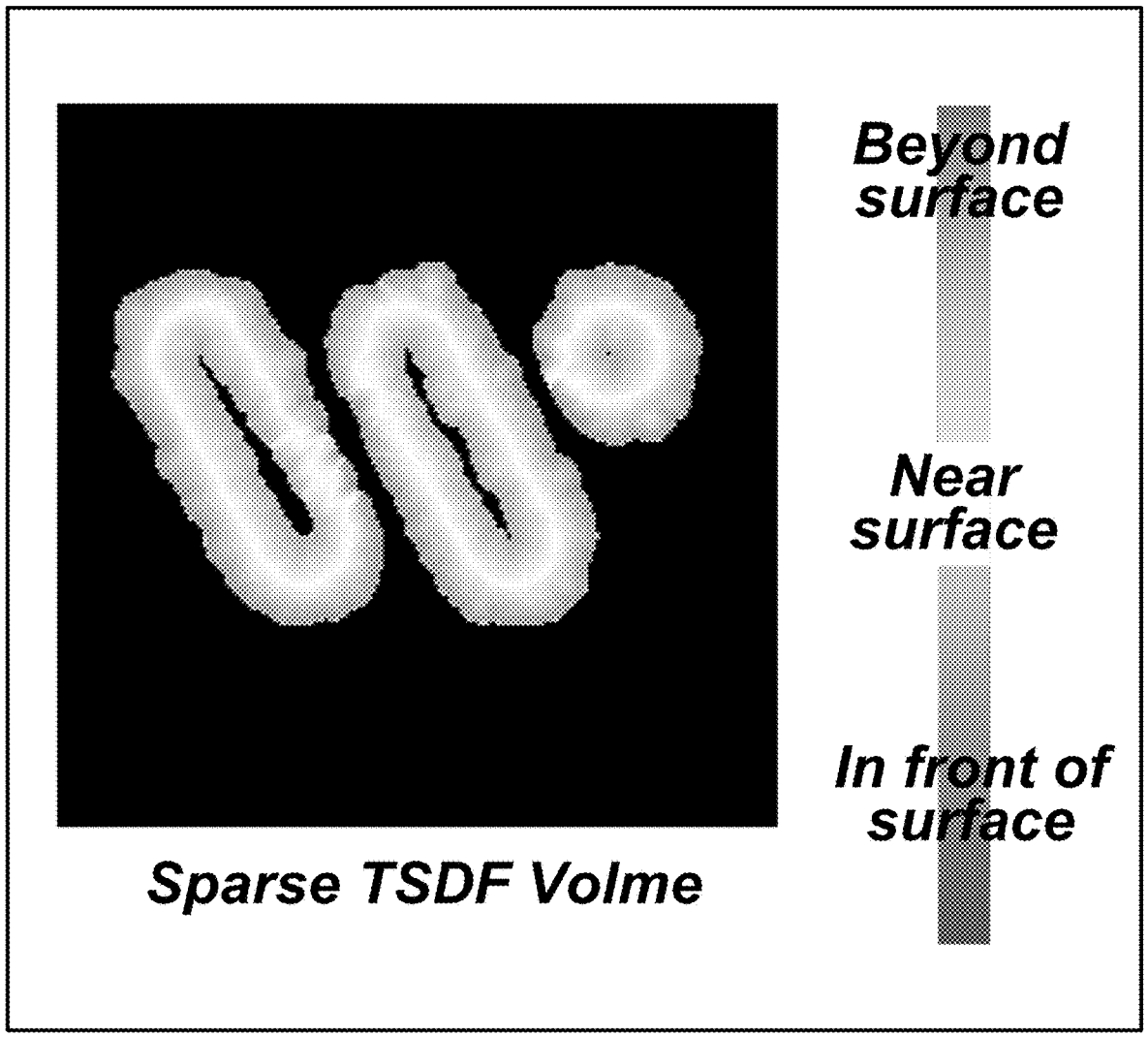
FIG. 4 is an illustration of an example 2-D TSDF representation.

The signed distance function value may be normalized to a predefined distance value. In one example, this predefined value can be a small distance such as 5 cm, although any suitable value can be used. For example, the normalization can be adapted depending on the noise level and the thickness of the object being reconstructed. This can be defined manually by a user, or derived automatically though analysis of the noise in the data. It is then determined whether the normalized distance is greater than a positive threshold value (if the signed distance is positive) or less than a negative threshold value (if the signed distance is negative). If so, then the signed distance function values are truncated to maximum or minimum values. For example, if the normalized distance is greater than the positive threshold value, then the value can be truncated at +1 (the positive threshold value after normalizing), and if the normalized distance is less than the negative threshold value, then the value can be truncated at −1 (the negative threshold value after normalizing). The result of this calculation is known as a truncated signed distance function $\sigma_{TSDF}: \mathbb{R}^3 \rightarrow \mathbb{R}$ An example point cloud representation of an environment and an example TSDF-based representation of the environment are illustrated in FIGS. 3A-B, respectively. Specifically, as depicted in FIG. 3B, the point cloud (made up of a collection of data points) from FIG. 3A has been converted to a collection of numerical values each indicating a truncated signed distance function value associated with a corresponding voxel within the TSDF model. FIG. 4 is an illustration of an example 2-D TSDF representation which depicts a collection of numerical values each indicating a truncated signed distance function value associated with a corresponding voxel within the TSDF model.

The sensor calibration subsystem 130 also includes a calibration parameter estimation engine 134, which can determine refined calibration parameter values based on iteratively performing a comparison or analysis between information derived from the TSDF data 136 and information provided by the raw sensor measurement 122. In brief, this involves running a non-linear optimization algorithm in search for respective values of the set of calibration parameters which optimizes an objective function that evaluates, for each of some or all points in the point cloud, a difference (e.g., in terms of squared residuals) between its current coordinate values provided by the raw LIDAR measurements and its target coordinate values derived from the corresponding TSDF model. Determining refined values for the LIDAR sensor calibration parameters will be described in more detail below with reference to FIG. 2.

The calibration parameter estimation engine 134 can then use the set of refined calibration parameter values 148 to update the collection of calibration parameters 146 that is maintained (e.g., in a memory device accessible to the system) by a calibration engine 142 included in the sensor calibration subsystem 130. The calibration engine 142 can use these parameters 146 to improve overall quality of the measurements captured by the LIDAR sensor, including defining a corresponding transformation from raw LIDAR sensor measurements to a calibrated point cloud which accounts for, or compensates for, any errors including distortions, offsets, and/or misalignments that may be present in the measurement capturing process of the LIDAR sensor.

In one example, in mathematical terms, the calibration engine 142 can do this by transforming, based on using a projection function parameterized by the set of calibration parameters, each raw LIDAR sensor measurement z as defined in LIDAR sensor coordinate frame (denoted below as "laser" frame) to a corresponding point p in the calibrated point cloud as defined in vehicle coordinate frame (denoted below as "vehicle" frame):

$$^{vehicle}t_{vehicle_{to}p} = {^{vehicle}_{laser}}T(\pi_{laser}(z,I)) \qquad \text{(Equation 1)},$$

where $\pi_{laser}$ (z, I) is an intrinsic projection component parameterized by the set of K intrinsic calibration parameters which defines a transformation of raw LIDAR sensor measurements z (in polar coordinates) into corresponding data points defined with respect to the laser frame (in Cartesian coordinates), and where $T \in SE(3)$ is an extrinsic projection component parameterized by the set of extrinsic calibration parameters, including a rotation component $R \in SO(3)$ and a translation component $t \in \mathbb{R}^3$, that defines a transformation of data points defined with respect to the laser frame (in Cartesian coordinates) into data points defined with respect to the vehicle frame: $^{vehicle}t_{vehicle_{to}p} = {^{vehicle}_{laser}}T \cdot {^{laser}}t_{laser_{to}p}$.

As a particular example, the intrinsic projection component of Equation 1 can be parameterized by a set of three intrinsic calibration parameters (i.e., K=3) including a mirror offset angle (ξmo), a transmitter rotation angle (ξtxr), and a distance offset (ξdo). It should be noted that, however, the exact forms of the functions and the details of the LIDAR sensor's intrinsic projection component are typically sensor-specific. That is, different LIDAR sensor may, and generally will, have different intrinsic calibration parameters than one another.

Figure 2:
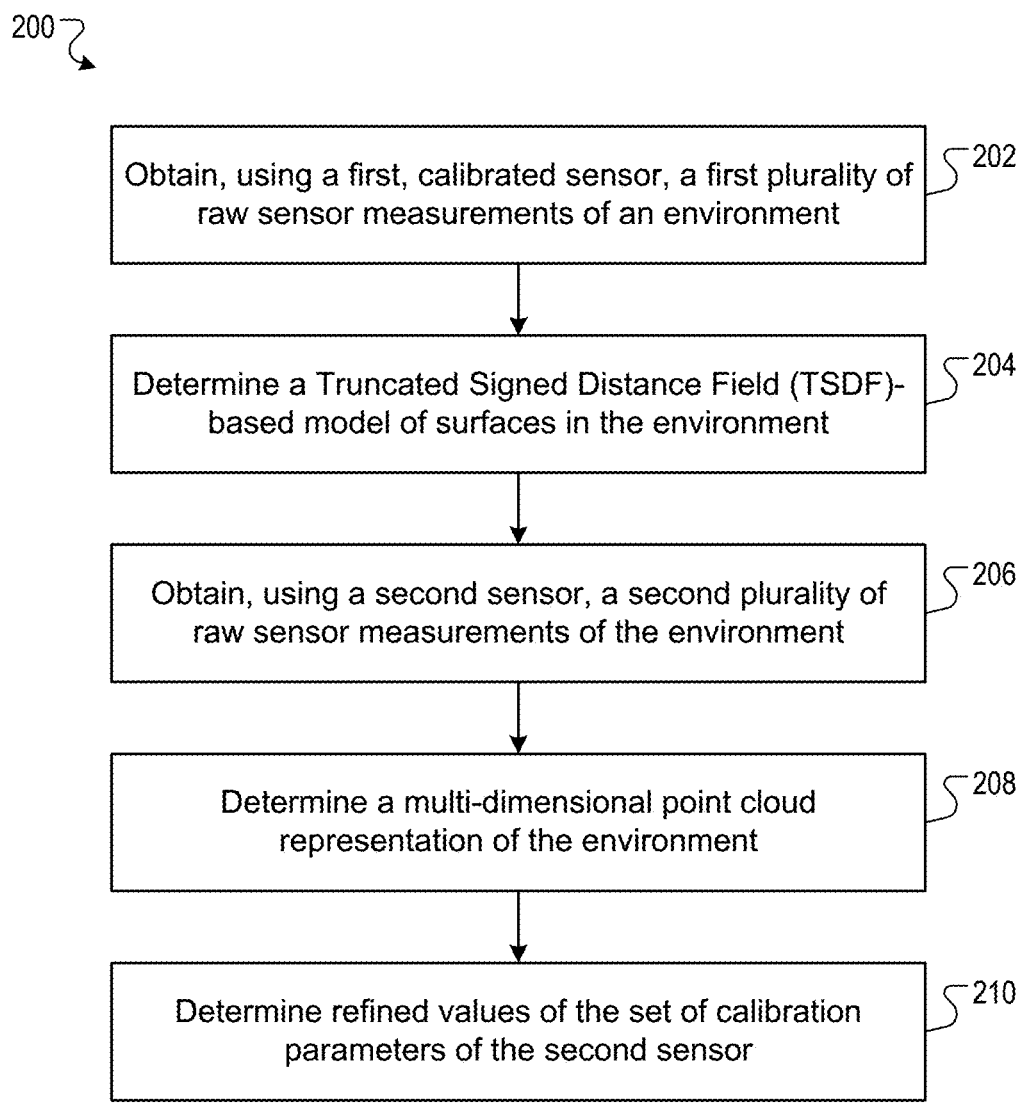
FIG. 2 is a flow diagram of an example process for calibrating an on-board sensor of a vehicle.

FIG. 2 is a flow diagram of an example process for calibrating an on-board sensor of a vehicle. In particular, the sensor is a LIDAR sensor that is configured to detect reflections of laser light. For convenience, the process 200 will be described as being performed by a system of one or more computers located in one or more locations. For example, a system, e.g., the on-board system 100 of FIG. 1, appropriately programmed in accordance with this specification, can perform the process 200.

The process 200 may be repeated as often as necessary to determine up-to-date values for a set of calibration parameters for a sensor. For example, the process 200 may be repeated once a day, or once a week, or once a month. As another example, the process 200 can be triggered by a perturbation to the body of the vehicle so that the process is repeated every time there is likely some change to the internal properties, external properties (i.e., in terms of pose of the sensor with reference to the vehicle), or both of the sensor.

The system obtains a first plurality of raw sensor measurements of an environment using a first, calibrated sensor (202). For example, the environment can be an environment in a vicinity of the vehicle as it navigates through an urban scenario, a highway, or a parking lot. For example, the system can obtain the first plurality of raw sensor measurements using a different LIDAR sensor of the vehicle the calibration parameter values of which are known.

Each raw sensor measurement, i.e., each laser shot point, can include a depth value being related to a distance from the sensor to a point on a surface in the environment in the sensor coordinate frame. Each raw sensor measurement can also include respective measurements of pitch and yaw angles of the laser beam. That is, each laser shot point can be defined by (i) a depth value being related to a range from the sensor to the point on the surface in the environment in the sensor coordinate frame, (ii) a first angle value being related to a pitch angle from the sensor to the point on the surface in the environment in the sensor coordinate frame, and (iii) a second angle value being related to a yaw angle from the sensor to the point on the surface in the environment in the sensor coordinate frame.

The system determines, from the first plurality of raw sensor measurements, a Truncated Signed Distance Field (TSDF)-based model of surfaces in the environment (204).

As described above, the system can do this by first building an empty 3D model and then gradually filling it by aggregating information derived from the calibrated point that is determined from the first plurality of raw sensor measurements. The TSDF-based model can be in form of a 3D voxel grid, where each voxel stores a numerical value which is a truncated signed distance function value, which provides information regarding the distance between the voxel and a nearest surface of the environment.

The system obtains a second plurality of raw sensor measurements of the environment using a second sensor (206) the calibration parameter values of which need to be determined. The second plurality of raw sensor measurements generally includes the same types of information as the first plurality of raw sensor measurements collected by the first, calibrated sensor, i.e., laser beam range (or depth value), and laser beam pitch and yaw angles. Specifically, the system uses both the first and the second sensor to make observation of the same environment. In other words, the second plurality of raw sensor measurements are collected concurrently, or at least substantially concurrently, with the first plurality of raw sensor measurements.

The system determines, based on the second plurality of raw sensor measurements and an initial values of a set of calibration parameters of the second sensor, a three-dimensional point cloud representation of the environment (208). The initial values of the intrinsic calibration parameters, for example, can be current values that have been determined from the last time the process 200 was performed, or default values provided by the manufacturer of the sensor. The initial values of the extrinsic calibration parameters, for example, can similarly be current values that have been determined from the last time the process 200 was performed, or roughly estimated values obtained through hand measuring.

Specifically, the system can compute the 3-D point cloud representation from the second plurality of raw sensor measurements according to the aforementioned Equation 1, i.e., by substituting the initial values of the set of calibration parameters into these equations. The 3-D point cloud representation generated in this way generally include a plurality of data points each being defined by multiple (e.g., three) values representing respective coordinates (e.g., x, y, z coordinates), in a vehicle coordinate frame.

The system determines refined values of the set of calibration parameters of the second sensor (210).

In some implementations, the system can do this in a jointly manner. To jointly determine the calibration parameters, including the set of intrinsic calibration parameters and the set of extrinsic calibration parameters, the system can evaluate an objective function that measures a difference between, for each of one or more of the plurality of data points in the three-dimensional point cloud representation, (i) the multiple values that define the data point and (ii) multiple values that define a target data point derived from the Truncated Signed Distance Field (TSDF)-based model of surfaces in the environment. For example, the system can evaluate the first objective function as:

$$\min_{T \in SE^3, I \in R^K} \sum_{i=1}^{N} \|\rho(_{laser}^{vehicle} T(\pi_{laser}(z, I)))\|_2^2,$$

where N is the total number of raw LIDAR sensor measurements z and, as similarly described above, $\pi_{laser}(z, I)$ defines a transformation of a raw LIDAR sensor measurement z into a data point as defined in LIDAR sensor coordinate frame ("laser" frame), $T \in SE(3)$ defines a transformation of a data point as defined in laser frame into a corresponding data point in the calibrated point cloud as defined in vehicle coordinate frame ("vehicle" frame), and $\rho: \mathbb{R}^3 \to \mathbb{R}$ is the TSDF function that, given a data point, returns its signed distance to the surface.

In other words, to derive the coordinates of each target data point in the vehicle coordinate frame, the system can query the TSDF model using the corresponding data point and thereafter retrieve a value representing a distance between the data point and a nearest surface in the environment. The system can then compute calibration parameters that minimize an aggregated measure of the distances, e.g., a sum of squared distances. The result of the minimization computation can be used as the new sensor calibration parameters.

For example, the system can evaluate the first objective function to identify a refined set of calibration parameter values that optimizes, i.e., minimizes, the sum of squared distances computed using the objective function. The system can do this by providing input data specifying the calibration parameters and the objective as defined by the objective function to a suitable solver, e.g., Ceres Solver, by using an application programming interface (API) offered by the solver. Such solvers typically implement software that is configured to iteratively derive updated parameter values which can optimize the objective function by applying suitable optimization techniques, e.g., non-linear least square optimization algorithms.

In some implementations, the system can determine calibration parameter values in a separate manner. For example, the system can specifically determine refined values for the set of intrinsic calibration parameters by evaluating a different objective function that measures respective positional differences between the plurality of data points and the plurality of target data points determined form the TSDF-based model with reference to the sensor coordinate frame.

Once the refined set of calibration parameter values have been identified, the system can transform raw LIDAR sensor measurements to calibrated point clouds according to the aforementioned Equation 1, i.e., by substituting the refined values of the set of calibration parameters into these equations, and then send the calibrated point cloud for use in perception processing and/or trajectory planning. In particular, the system can do this at runtime, i.e., while the vehicle is navigating through an environment and concurrently using one or more on-board LIDAR sensors to collect raw LIDAR sensor measurements of the environment.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:
  obtaining, using a first, calibrated sensor, a first plurality of raw sensor measurements of an environment, wherein each raw sensor measurement comprises a depth value being related to a distance from the sensor to a point on a surface in the environment in a sensor coordinate frame;
  determining, from the first plurality of raw sensor measurements, a Truncated Signed Distance Field (TSDF)-based model of surfaces in the environment;
  obtaining, using a second sensor, a second plurality of raw sensor measurements of the environment;
  determining, based on the second plurality of raw sensor measurements and initial values of a set of calibration parameters of the second sensor, an initial multi-dimensional point cloud representation of the environment, the multi-dimensional point cloud representation comprising a plurality of data points each being defined by multiple values representing respective coordinates in a vehicle coordinate frame; and
  determining refined values of the set of calibration parameters of the second sensor, including evaluating an objective function that measures a difference between, for each of one or more of the plurality of data points in the multi-dimensional point cloud representation, (i) the multiple values that define the data point and (ii) multiple values that define a target data point derived from the Truncated Signed Distance Field (TSDF)-based model of surfaces in the environment.

Embodiment 2 is the method of embodiment 1, wherein each raw sensor measurement further comprises (i) a first angle value being related to a pitch angle from the sensor to the point on the surface in the environment in the sensor coordinate frame and (ii) a second angle value being related to a yaw angle from the sensor to the point on the surface in the environment in the sensor coordinate frame.

Embodiment 3 is the method of any one of embodiments 1 or 2, wherein:
  the first sensor and the second sensor are each a respective LIDAR sensor of a vehicle; and
  the environment is an environment in a vicinity of the vehicle Embodiment 4 is the method of any one of embodiments 1-3, further comprising:
  determining, based on the second plurality of raw sensor measurements and the refined values of the set of calibration parameters of the second sensor, a calibrated multi-dimensional point cloud representation of the environment.

Embodiment 5 is the method of any one of embodiments 1-4, wherein the set of calibration parameters comprise (i) a set of extrinsic calibration parameters that define a pose of the sensor in the vehicle coordinate frame and (ii) a set of intrinsic calibration parameters that define internal properties of the sensor.

Embodiment 6 is the method of any one of embodiments 1-5, further comprising:
  determining, from the second plurality of raw sensor measurements and the refined values of the calibration parameters of the second sensor, a calibrated multi-dimensional point cloud representation of the environment.

Embodiment 7 is the method of any one of embodiments 1-6, wherein deriving the multiple values that define the target data point comprises:
  calculating, based on the TSDF-based model of surfaces in the environment, a distance between the data point and a nearest surface in the environment.

Embodiment 8 is the method of any one of embodiments 1-7, wherein determining refined values of the set of calibration parameters of the second sensor comprises:
  iteratively deriving the refined values of the set of calibration parameters of the second sensor using the objective function and based on a nonlinear least square optimization technique.

Embodiment 9 is a system comprising: one or more computers and one or more storage devices storing instructions that are operable, when executed by the one or more computers, to cause the one or more computers to perform the method of any one of embodiments 1 to 8.

Embodiment 10 is a computer storage medium encoded with a computer program, the program comprising instructions that are operable, when executed by data processing apparatus, to cause the data processing apparatus to perform the method of any one of embodiments 1 to 8.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method comprising:
    obtaining, using a first, calibrated sensor, a first plurality of raw sensor measurements of an environment, wherein each raw sensor measurement comprises a depth value being related to a distance from the sensor to a point on a surface in the environment in a sensor coordinate frame;
    determining, from the first plurality of raw sensor measurements, a Truncated Signed Distance Field (TSDF)-based model of surfaces in the environment;
    obtaining, using a second sensor, a second plurality of raw sensor measurements of the environment;
    determining, based on the second plurality of raw sensor measurements and initial values of a set of calibration parameters of the second sensor, an initial multi-dimensional point cloud representation of the environment, the multi-dimensional point cloud representation comprising a plurality of data points each being defined by multiple values representing respective coordinates in a vehicle coordinate frame; and
    determining refined values of the set of calibration parameters of the second sensor, including evaluating an objective function that measures a difference between, for each of one or more of the plurality of data points in the multi-dimensional point cloud representation, (i) the multiple values that define the data point and (ii) multiple values that define a target data point derived from the Truncated Signed Distance Field (TSDF)-based model of surfaces in the environment.

2. The method of claim 1, wherein each raw sensor measurement further comprises (i) a first angle value being related to a pitch angle from the sensor to the point on the surface in the environment in the sensor coordinate frame and (ii) a second angle value being related to a yaw angle from the sensor to the point on the surface in the environment in the sensor coordinate frame.

3. The method of claim 1, wherein:
    the first sensor and the second sensor are each a respective LIDAR sensor of a vehicle; and
    the environment is an environment in a vicinity of the vehicle.

4. The method of claim 1, further comprising:
    determining, based on the second plurality of raw sensor measurements and the refined values of the set of calibration parameters of the second sensor, a calibrated multi-dimensional point cloud representation of the environment.

5. The method of claim 1, wherein the set of calibration parameters comprise (i) a set of extrinsic calibration parameters that define a pose of the sensor in the vehicle coordinate frame and (ii) a set of intrinsic calibration parameters that define internal properties of the sensor.

6. The method of claim 1, further comprising:
    determining, from the second plurality of raw sensor measurements and the refined values of the calibration parameters of the second sensor, a calibrated multi-dimensional point cloud representation of the environment.

7. The method of claim 1, wherein deriving the multiple values that define the target data point comprises:
    calculating, based on the TSDF-based model of surfaces in the environment, a distance between the data point and a nearest surface in the environment.

8. The method of claim 1, wherein determining refined values of the set of calibration parameters of the second sensor comprises:
    iteratively deriving the refined values of the set of calibration parameters of the second sensor using the objective function and based on a nonlinear least square optimization technique.

9. A system comprising one or more computers and one or more storage devices storing instructions that are operable, when executed by the one or more computers, to cause the one or more computers to perform operations comprising:
    obtaining, using a first, calibrated sensor, a first plurality of raw sensor measurements of an environment, wherein each raw sensor measurement comprises a depth value being related to a distance from the sensor to a point on a surface in the environment in a sensor coordinate frame;
    determining, from the first plurality of raw sensor measurements, a Truncated Signed Distance Field (TSDF)-based model of surfaces in the environment;
    obtaining, using a second sensor, a second plurality of raw sensor measurements of the environment;
    determining, based on the second plurality of raw sensor measurements and initial values of a set of calibration parameters of the second sensor, an initial multi-dimensional point cloud representation of the environment, the multi-dimensional point cloud representation comprising a plurality of data points each being defined by multiple values representing respective coordinates in a vehicle coordinate frame; and determining refined values of the set of calibration parameters of the second sensor, including evaluating an objective function that measures a difference between, for each of one or more of the plurality of data points in the multi-dimensional point cloud representation, (i) the multiple values that define the data point and (ii) multiple values that define a target data point derived from the Truncated Signed Distance Field (TSDF)-based model of surfaces in the environment.

10. The system of claim 9, wherein each raw sensor measurement further comprises (i) a first angle value being related to a pitch angle from the sensor to the point on the surface in the environment in the sensor coordinate frame and (ii) a second angle value being related to a yaw angle from the sensor to the point on the surface in the environment in the sensor coordinate frame.

11. The system of claim 9, wherein:
the first sensor and the second sensor are each a respective LIDAR sensor of a vehicle; and
the environment is an environment in a vicinity of the vehicle.

12. The system of claim 9, wherein the operations further comprise:
determining, based on the second plurality of raw sensor measurements and the refined values of the set of calibration parameters of the second sensor, a calibrated multi-dimensional point cloud representation of the environment.

13. The system of claim 9, wherein the set of calibration parameters comprise (i) a set of extrinsic calibration parameters that define a pose of the sensor in the vehicle coordinate frame and (ii) a set of intrinsic calibration parameters that define internal properties of the sensor.

14. The system of claim 9, wherein the operations further comprise:
determining, from the second plurality of raw sensor measurements and the refined values of the calibration parameters of the second sensor, a calibrated multi-dimensional point cloud representation of the environment.

15. The system of claim 9, wherein deriving the multiple values that define the target data point comprises:
calculating, based on the TSDF-based model of surfaces in the environment, a distance between the data point and a nearest surface in the environment.

16. The system of claim 9, wherein determining refined values of the set of calibration parameters of the second sensor comprises:
iteratively deriving the refined values of the set of calibration parameters of the second sensor using the objective function and based on a nonlinear least square optimization technique.

17. One or more non-transitory computer storage media encoded with computer program instructions that when executed by a plurality of computers cause the plurality of computers to perform operations comprising:
obtaining, using a first, calibrated sensor, a first plurality of raw sensor measurements of an environment, wherein each raw sensor measurement comprises a depth value being related to a distance from the sensor to a point on a surface in the environment in a sensor coordinate frame;
determining, from the first plurality of raw sensor measurements, a Truncated Signed Distance Field (TSDF)-based model of surfaces in the environment;
obtaining, using a second sensor, a second plurality of raw sensor measurements of the environment;
determining, based on the second plurality of raw sensor measurements and initial values of a set of calibration parameters of the second sensor, an initial multi-dimensional point cloud representation of the environment, the multi-dimensional point cloud representation comprising a plurality of data points each being defined by multiple values representing respective coordinates in a vehicle coordinate frame; and
determining refined values of the set of calibration parameters of the second sensor, including evaluating an objective function that measures a difference between, for each of one or more of the plurality of data points in the multi-dimensional point cloud representation, (i) the multiple values that define the data point and (ii) multiple values that define a target data point derived from the Truncated Signed Distance Field (TSDF)-based model of surfaces in the environment.

18. The non-transitory computer storage media of claim 17, wherein each raw sensor measurement further comprises (i) a first angle value being related to a pitch angle from the sensor to the point on the surface in the environment in the sensor coordinate frame and (ii) a second angle value being related to a yaw angle from the sensor to the point on the surface in the environment in the sensor coordinate frame.

19. The non-transitory computer storage media of claim 17, wherein the set of calibration parameters comprise (i) a set of extrinsic calibration parameters that define a pose of the sensor in the vehicle coordinate frame and (ii) a set of intrinsic calibration parameters that define internal properties of the sensor.

20. The non-transitory computer storage media of claim 17, wherein the operations further comprise:
determining, from the second plurality of raw sensor measurements and the refined values of the calibration parameters of the second sensor, a calibrated multi-dimensional point cloud representation of the environment.

* * * * *